(12) United States Patent
Oliver et al.

(10) Patent No.: US 8,666,974 B2
(45) Date of Patent: Mar. 4, 2014

(54) METHODS AND SYSTEMS FOR PERFORMING HIGH VOLUME SEARCHES IN A MULTI-TENANT STORE

(75) Inventors: Kevin Oliver, San Francisco, CA (US); Paul Burstein, San Francisco, CA (US); Jeffrey M. Bergan, San Francisco, CA (US); William A. Press, Berkeley, CA (US)

(73) Assignee: salesforce.com, inc., San Francisco, CA (US)

( * ) Notice: Subject to any disclaimer, the term of this patent is extended or adjusted under 35 U.S.C. 154(b) by 48 days.

(21) Appl. No.: 13/087,210

(22) Filed: Apr. 14, 2011

(65) Prior Publication Data

US 2011/0258199 A1    Oct. 20, 2011

Related U.S. Application Data

(60) Provisional application No. 61/324,946, filed on Apr. 16, 2010.

(51) Int. Cl.
*G06F 17/30* (2006.01)

(52) U.S. Cl.
USPC ........... 707/722; 707/705; 707/706; 707/715; 707/736

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

OTHER PUBLICATIONS

International Search Report and Written Opinion for Application No. PCT/US2011/032781 dated Nov. 28, 2011, 10 pages.

(Continued)

*Primary Examiner* — Hung Q Pham
(74) *Attorney, Agent, or Firm* — Blakely Sokoloff Taylor & Zafman LLP

(57) ABSTRACT

Method and systems for performing high volume searches are described. In one example a method includes receiving a query directed to a database, the database including a plurality of items, determining whether the query complies with one of a plurality of search criteria, each of the plurality of search criteria corresponding to a predefined index of the database, selecting a predefined index of the database corresponding to one of the plurality of search criteria if the query complies with said search criterion, the index containing entries that comply with the corresponding search criterion, applying the query to the selected index to find database items referenced in the index, selecting items based on applying the query to the selected index, building a report for the query, the report including only items of the selected index.

20 Claims, 6 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,951 B1 | 6/2002 | Galindo-Legaria et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0107840 A1 | 8/2002 | Rishe |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0148273 A1* | 7/2004 | Allen et al. ............ 707/2 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1* | 10/2005 | Weissman et al. ............ 707/102 |
| 2007/0214104 A1 | 9/2007 | Miao et al. |
| 2008/0033909 A1* | 2/2008 | Hornkvist et al. ............ 707/2 |
| 2008/0183687 A1* | 7/2008 | Law ............ 707/4 |
| 2009/0063490 A1* | 3/2009 | Fuerst et al. ............ 707/9 |
| 2009/0164447 A1 | 6/2009 | Daya |
| 2009/0276395 A1 | 11/2009 | Weissman et al. |

OTHER PUBLICATIONS

International Preliminary Report on Patentability for Application No. PCT/US2011/032781 dated Oct. 16, 2012, 9 pages.

* cited by examiner

METHODS AND SYSTEMS FOR PERFORMING HIGH VOLUME SEARCHES IN A MULTI-TENANT STORE

CLAIM OF PRIORITY

This application claims the benefit of U.S. Provisional Application Ser. No. 61/324,946, entitled Methods and Systems for Performing High Volume Searches in a Multi-Tenant Store, by Kevin Oliver, et al, filed Apr. 16, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to providing customer support from multiple different sources in a single system.

BACKGROUND

In some query systems, an upper limit is placed on the number of results that may be provided in response to a query. A limit may also be placed on the number of results that are retrieved at intermediate levels or stages of processing a search. So for example at a first stage, a search query might be processed until there are for example, 500, 10,000, 50,000, 200,000 or some other maximum number of results. After the results reach the maximum cutoff number, then searching stops. This allows the search to be completed in less time and reduces the demands on the search system. Since a user will rarely wish to see even 200 results, 50,000 may be a safe maximum. At a second stage of a search, the results may be reduced again to, for example, the top 10,000.

A search index is one type of search data structure used for servicing queries for a given organization or database. A search index may sometimes be broken up into partitions or shards for large organizations or large databases. As more documents are added to a search index, it becomes more likely that queries against that index will bump up against a 50 k, a 10 k or any other reasonable collection limits. The collection limits are intended to cause the search results to be truncated. However, in some cases the truncation will lead to less relevant end-user results. Placing any upper limit on the number of results can prevent the search from retrieving the results that the user is looking for.

A problem arises if the search is limited at one stage and then further filtered or post-filtered at another stage. It can happen that the search returns no results, because all of the collected results are later filtered out. In other cases, in the final results there may be only a few hits or only low ranking or poor hits.

BRIEF SUMMARY

Method and systems for performing high volume searches are described. In one example a method includes receiving a query directed to a database, the database including a plurality of items, determining whether the query complies with one of a plurality of search criteria, each of the plurality of search criteria corresponding to a predefined index of the database, selecting a predefined index of the database corresponding to one of the plurality of search criteria if the query complies with said search criterion, the index containing entries that comply with the corresponding search criterion, applying the query to the selected index to find database items referenced in the index, selecting items based on applying the query to the selected index, building a report for the query, the report including only items of the selected index.

While one or more implementations and techniques are described with reference to an embodiment in which high volume searches are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Query Overview

Figure 1:
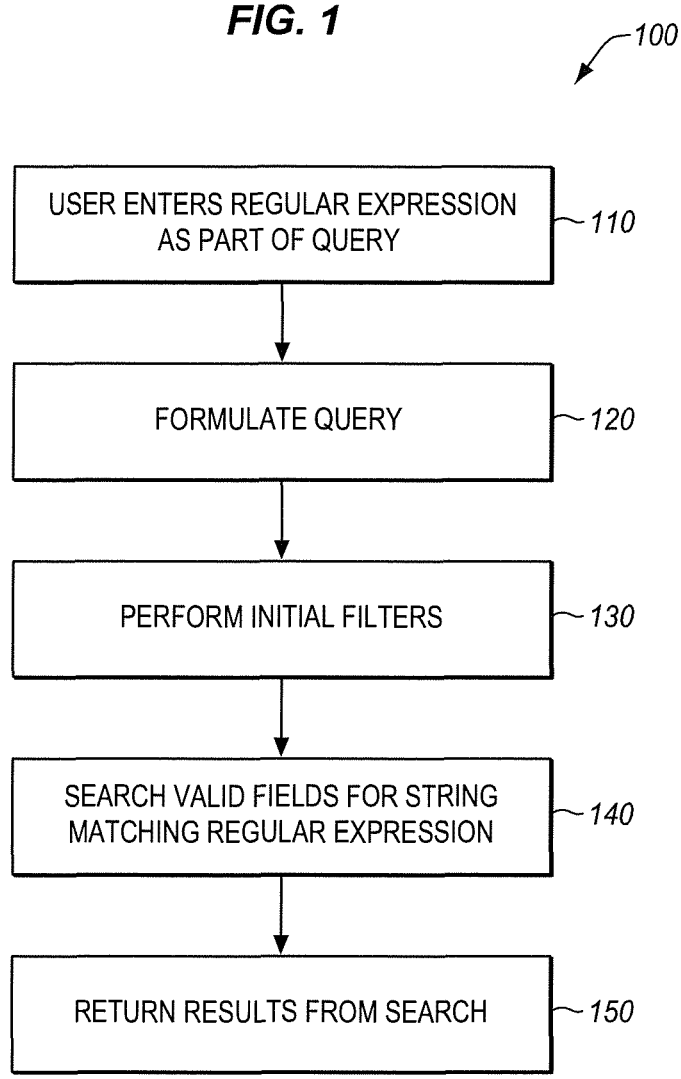
FIG. 1 is an operational flow diagram illustrating a high level overview of a technique for querying a multi-tenant database in an embodiment.

In one example, Lucene (a text search engine library from the Apache Software Foundation written in Java, a programming language from Sun Microsystems) is used to develop document identifiers (docids) from a query up to a maximum upper limit of 50,000. The results are scored in Lucene and post-filtering is applied so that only the highest scoring 10,000 of those are selected. The corresponding records are retrieved only for those 10,000. The score can be based on standard tf-idf (term frequency-inverse document frequency), though some characteristics may be boosted in the rankings for things such as matching on owner and some filter clauses. The particular numbers of 50,000 and 10,000 are provided here as examples only. The principles described herein may be applied to systems with much higher or lower collection limits or to systems with no collection limits at all.

In one embodiment, while the data that is searched originally comes from the database, the database is not queried directly. Data is extracted from the database and stored in a search system. The query is applied to the search system. In one example, there is a search that is run against the search system and then these results are post-filtered against the database. In other words, the results of the search index query are then post-filtered in the database using different criteria than those of the search string. These filter criteria may include authorization rules or separate filters defined by a user.

If a user, for example, is only authorized to view 5 documents but the search query matches 1 million documents, the presence of limits in the search system means the search query might only return 10,000 results, or 1% of the total number of matches. The odds are good that none of the 5 documents that the user is authorized to view will be in these 10,000 results. The post-filtering causes the query to return 0 authorized results. This can be frustrating to a user who knows that the database contains at least some documents that match the query.

A variety of different filters can be applied in the database after a collection limit is reached, for example a date or time filter, a source or account filter, or an authorization or privileges filter. An authorization filter refers to a filter that limits results to those which a user is authorized to access. If the search only returns results to which the user does not have access, then no results can be provided to the user.

The efficiency and quality of a search are improved by first analyzing a search query to select a characteristic of a search that is going to limit the number of records that it can retrieve from a database. This characteristic may be a data field, such as date, time, address, size, or a dollar amount, it may be user access privileges, or some other common criterion. This characteristic is indexed and the query is applied first against the index. The rest of the query is then applied against the results from this specific index. By putting this limiting characteristic first, the results are limited to those that pass the criterion, making the results more relevant. The search is also limited to those that pass the criterion making the search faster.

FIG. 1 is a flowchart illustrating a simplified method 100 for performing a database search according to an embodiment. A user may enter a regular expression in order to find values stored in particular fields of a database. Additional parameters for the search may request particular data ranges for values associated (e.g. linked) with that field. For example, when a field is stored as table data at a column and row, the additional parameters may select particular data from that column.

In step 110, the user enters a regular expression. In one embodiment, this may be done by entering symbols and characters into a window of an application (e.g. application running on the database), or a browser or application interface running on a client machine. In another embodiment, characters may be combined with actions (e.g. corresponding to particular symbols) chosen from lists (such as drop down lists).

In step 120, a query is formulated based on the regular expression that was entered. For example, an application server or a query host of the database system may formulate the query. The query may include other filters (e.g. additional parameters) entered by the user or imposed by the search system. For example, the system may allow access to only data to which the user is authorized.

In step 130, filters may be imposed by the query host in order to limit the number of character strings searched. The user application can apply the filters that the user provides or the application may impose its own filters or both. The filters may be applied before or after using the regular expression. For example, the number of fields to be searched can be decreased by applying the filters.

In step 140, valid fields (i.e. fields passing the initial filters) are searched for a string matching the regular expression. Various mechanisms may be used to perform the search.

In step 150, the results are returned. In one embodiment, the matching strings may be aggregated and then returned all at once. In another embodiment, results associated with each matching string may be returned when that matching string is found. Additional filtering or searches may be performed using the matching strings. For example, data linked to a particular string may then be searched using filters (e.g. parameters) input by a user.

Determining whether all or part of a character string matches a regular expression is not a simple task. The characters may be allocated among the operators in many different ways. Accordingly, separate indexes can be used to parse the database particularly for efficient search.

Figure 2:
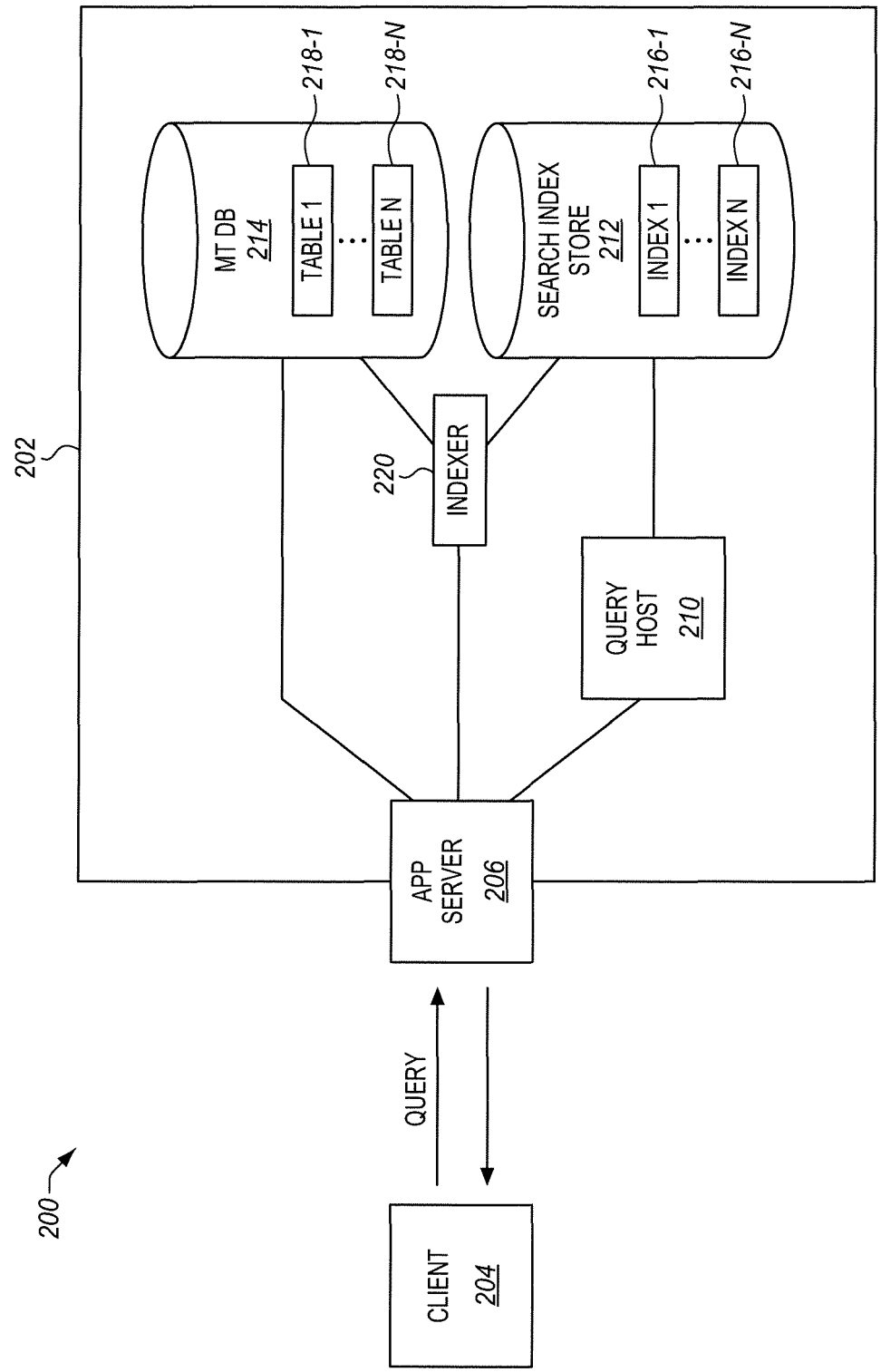
FIG. 2 illustrates a representative system for querying a multi-tenant database and the database in an embodiment.

FIG. 2 illustrates an architecture 200 for querying search indexes drawn from a database using a network connection in an embodiment. As an option, the architecture 200 may be used to carry out the method 100 of FIG. 1. The architecture 200 includes a system 202 including an application program server or interface 206. A search index store 212 containing multiple search indexes is provided which interfaces a query host 210. The query host 210 is coupled on one side to the application server 206 and on the other side to the search index store 212. The application server 206 may include any entity capable of offloading the search indexes of the search index store 212 or of caching query results.

Further included in the database system 202 is a multi-tenant database 214. The multi-tenant database 214 includes some number N of tables of data 218-1 to 218-N. The search index store 212 includes some number N of indexes 216-1 to 216-N drawn from the data in the multi-tenant database 214. The indexes can be divided into any type of groupings that will best facilitate rapid and efficient search. The indexes may also be broken up into partitions or shards so that each index contains partitions for a particular tenant, for example. Additional indexes can be built to serve particularly common searches or data that may otherwise be difficult to search. An indexer 220 coupled to both the search index store 212 and the multi-tenant database 214 gathers data from the multi-tenant database to build indexes and to update indexes in the search index store. The indexer is coupled to the query host 210 that controls the indexing processes and their timing.

In use, a client 204 (shown here as a single client, but there may be thousands of clients) uses the system 202 to store data in the multi-tenant database 214, and to retrieve data associated with one or more tenants of the system 202.

The client 204 may generate a query and transmit the query to the system 202 for receipt by the application server 206. The query may be based on any desired syntax and may be generated directly by the user of an application running either at the client 204 or at the application server or application host 206.

Upon receipt of the query, the application server API 206 processes it and provides it to the query host 210. The query may be forwarded to the query host 210 to translate it in a manner appropriate for querying the search index store 212.

In one example of use, the client 204 may generate and transmit a first type of query, e.g. utilizing an extended simple query language (SQL), object query language (OQL), or any other appropriate format, adapted for use over a network, while the query host 210 may translate the query into one or more queries, e.g. search index queries, etc., of a second type which are specifically tailored for querying the indexes of the search index store using various join conditions, etc. Due to specific protocol requirements, a single query from the client 204 may be translated into multiple queries to the search index store under the direction of the query host 210.

In response to one or more queries from the query host 210, data is returned to the client 204. The data may be presented to the client 204 utilizing an appropriate description language, e.g. XML, web services description language (WSDL), etc., or any other suitable format.

To reduce the amount of data transmitted over the network, to reduce the time spent in searching, and to make the results easier for the user to receive and review, the resulting data set may be divided into subsets, e.g. "chunks," etc., which are sent to the client 204 one-at-a-time. On the other hand, if the system 202 determines that the data resulting from the query is larger than a determined amount, the data may be reduced and only a part of the data is transmitted to the client 204.

Data-Based Relevancy

Changes can be made to improve the relevancy of a user's query results and the likelihood of the user receiving those hits after the results are filtered, such as in a post-filtering process. As mentioned above, the post-filtering may be based on access privileges, personal account data, or other filter criterion, such as date, location, names, etc. However, the relevancy of the query results will be further improved by applying a ranking to criteria applied by the search engine to the indexes.

By pushing the metadata and ranking functions down into the query engine, the results may be more relevant. This can be used to decrease the odds that the best results are never collected. If the results are truncated, then those that remain may be the most relevant, at least on some of the query criteria. Pushing down these ranking functions may also decrease the time spent checking results for authorization.

Formulas for ranking and re-ranking search result scores may be configured in any of a variety of different ways. Some possibilities are that they may be specific to a particular entity, partition, organization, or user group. Alternatively, a ranking formula may apply an overall ordering to the scores across all entities within a single partition or across multiple partitions.

Ranking can be applied to any searchable fields of the database. These fields are not required to be included in an index to be used in a separate ranking process, such as that applied using the database (after results are retrieved from search). However, any one or more of these fields or other fields may be indexed into search for use as a search criterion to affect the ordering of results or to constrain the search result set. The values in the fields may be ordered from highest to lowest, first to last, or in some other way to boost the most desired results to be selected first. Some examples of fields that may be used for ranking are listed below. Each field is listed with an indication of its data type.

last_update (date)
last_activity (date)
close_date (date)
closed (boolean)
escalation_state (boolean)
owner (string)
other fields specified by customers or developers To boost particular results in Boolean fields, the boolean fields can be indexed into separate fields (eg closeDate). Such an index may exclude characteristics or metadata such as term frequency, positions, or norms. When a query is applied against the index an additional clause can be added to the query to boost particular values in the search. So for example, a clause such as "[closeDate:1]^1.5" would boost results having a closing date later than the first of May.

Similarly identifiers (IDs) for any subject can be treated so as to boost desired results. IDs are similar to Boolean fields and can be treated in the same way. So, for example, the IDs can be indexed and then an additional clause can be added to boost particular identifiers. A particular owner could be boosted by adding a clause referring to that particular owner or the owner and any related entities. As with the Boolean fields, this can be done without including the norms, term frequency or positions at indexing time. However, this data may be included if desired.

Dates can also be indexed, ranked, and boosted in the same way as Booleans and identifiers. Because a user may be looking for a particular date or date range and not just the most recent items, more complexity can be used. In one example, if a version of Lucene is used for searching a NumericRangeQuery function is available. For example, a search for [warriors] might expand into a required term query for warriors, along with optional range queries with boosts for various date ranges. For example, an additional clause can be added to the query to boost the updates in the last week more than last month. Such a clause might take the following form:

[lastUpdate:[20100101-20100108]^1.8 lastUpdate:[20091201-20091231]^ 1.2].

Alternatively, there may be more than one index for a date field. Each field can be ordered to boost different dates. For example, there may be indexes with dates phrased as year-month, year-week, year-day. Boosting can be applied to boost the closest, finest grained dates. As a further alternative or as an addition, a boost can be applied after the results are scored. This additional boost can be done in any of a variety of different ways. In one example, the relevant field can be retrieved from the search index to use for the boost process.

Entity-Based Relevancy

Similar to how the data and name fields are boosted as described above, particular entities in the database can also be boosted over others. The boosting as in the other examples above helps to ensure that all of the relevant results are obtained before the collection limit is reached. Boosting can also be used to present the best results to the user at the top of the search results.

In one example, a parameter such as an entity or organization name parameter or class of names could be boosted at search time, to push more likely entity types higher into the results. In addition or instead, reverse boosts can be done in the same way on entity types that are never clicked on. This processing can be done at regular intervals. A small Hadoop cluster (a distributed computing utility from Apache Software Foundation) may be used to perform this processing asynchronously. The selection of entities to be boosted or reverse boosted can be made based on user behavior or other information. Different data may be used for individual organizations or users.

Authorization-Based Relevancy

Authorization based relevancy can also be used to pre-screen results. Record visibility is an important component of relevancy for query search results in any system that grants different access rights to different users or groups. While a document may be highly relevant (eg, high tf-idf), if the user running the query doesn't have authorization to that record, then its actual relevance to that user is 0. If the search results are first checked for authorization after the query has been executed on the query hosts and returned back to the application tier, then many good results may be eliminated. In other words, for large enough datasets, when a "low-visibility" user runs a non-selective query, the intersection of authorization and the search results can lead to a poor user experience because the user may get incomplete results. By searching only in records that the user can see, the query time can be shortened and the relevance of the results are improved.

Search results can be improved by taking the user's ownership into account and boosting the scores of those records. For users that have access to far more records than just the ones they own, additional owner IDs can be boosted. A cache of the owner or organization IDs used by a particular requesting user or entity can be used to improve results for users that have access to records of other owners. Such a cache could be fetched at the beginning of a query and made available to the query engine.

Authorization-based relevancy can also be used to improve results using a special index. The index can be compiled periodically for any users or organizations with a sufficiently large dataset. An index on authorization-based relevancy would be useful for many different users. One example is users that do not have permissions to view all of the data for their organization or for the whole database. Another example, is users that belong to an entity with a large data set, such as a million records. Another example is users that cannot see a large percent of the records for their organization. The particular percentage and the size of a large data set can be selected to suit different implementations and available tools.

The index can be created for authorization-based relevancy by computing a cached value of what a particular user group can see. In other words, the index can be created by determining which records are authorized for the particular user or group. These records can then be cached in a fast memory. The records can be stored as IDs of the actual records that occur in the database. If there are a small enough number of records, then they can be stored as a compressed set of IDs. For larger record sets, a variety of compression or search-oriented storage methods can be used, for example a bloom filter of IDs.

In one example a query is received and applied against one or more caches. At query time, after the IDs are retrieved from the search index, it can be determined whether the IDs exist in an entity-share cache. If the cache doesn't exist for an entity type, then no boosts are applied. If a cache does exist for the IDs, then only entities that are found in the cache are boosted. The amount of boost to apply can be adjusted to suit any particular implementation and type of user behavior. On the one hand, for very low visibility users on non-selective queries, large authorization boosts can be used. On the other hand, for more selective queries, a smaller or no boost may be applied.

By preparing caches in a separate process unrelated to the user's activity, it is possible that the caches will have stale and incorrect values. Similarly after users have made large scale authorization changes or other changes to the data, but before the entity-share cache is recomputed, search results could be slowed because the wrong results have been boosted. For example, the cache might boost results that the user can no longer see. However, such problems can be mitigated with frequent caching or controlling the user of the caches. For example, a cache might be invalidated or its use restricted after a large operation that affects authorization rights or other data. These operations might include changing role hierarchy, changing a user's role, etc.

The caches can be recalculated at periodic intervals or after major data changes or both. In addition, particular user events might be used to invoke the calculation of a cache. The particular selected frequency can be adapted to suit different conditions and usage models. In a calculation of the cache, the system can populate a new database table with org, user, key prefix, value, and last update. These values can then be pushed into the cache. The actual cache can take any of a variety of different forms including memcached (a general purpose memory caching system).

For scoring, the rankings and boosting may be relied upon instead of scoring. Alternatively, the scoring can be determined in a separate process after the search results are obtained. A more careful ranking may provide higher accuracy and provide the most important results to the user first. Alternatively, cache information may be plugged directly into the query engine and incorporated into the query's score.

Processes

Figure 3:
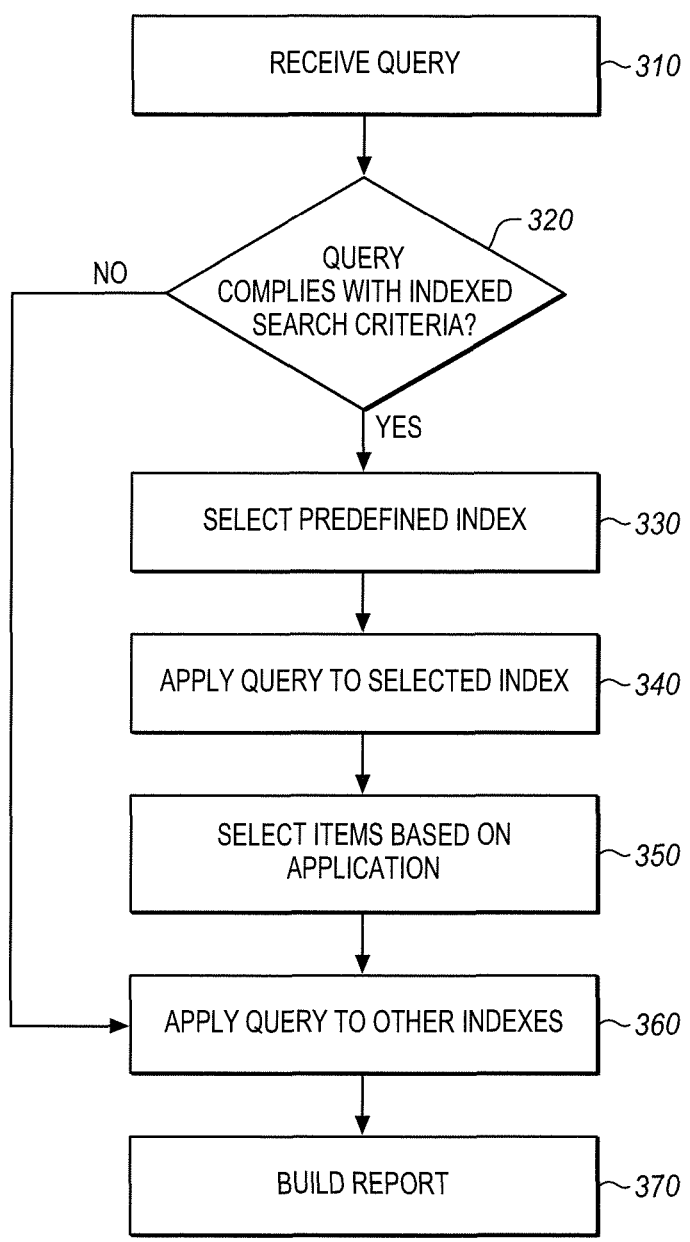
FIG. 3 is an operational flow diagram illustrating a high level overview of a technique for querying a multi-tenant database in an embodiment using indexed search criteria in an embodiment.

FIG. 3 is a simplified flowchart of performing a query using a search index. The process begins at 310 with receiving a query directed to a search. The search is directed a set of search indexes that are drawn from a database. The database can be a multi-tenant database as described in more detail below or a single-tenant database. In the case of a relational database, it includes many items organized in rows and columns. The search indexes contain identifiers for records of the items in the database. Accordingly, if the query finds a hit within a search index, the hit will relate to a record in the database. Using the identifiers in the index, the database records can be retrieved and provided as search results.

At 320, the query is received at a query host or application processor for processing. The query host determines whether the query complies with any one of a plurality of different search criteria. Each of the search criteria correspond to a predefined index drawn from the database. If there are many queries with unique criteria that are not indexed, then a new index can be constructed to handle such queries.

The search criteria can be any of the types suggested above, such as data, entity, or authorization related criteria, among others. In one example, the criterion is a time or a range of times, such as dates, or time of day. The corresponding index for such a criterion can be ordered based on a time sequence from most recent to least recent or vice versa. Such an ordering allows the query to very quickly be applied to the most recent items first based on the ordering of the index. For a query for the oldest items, the same index can be used in reverse order or another index can be generated which lists the items from oldest to newest. Similarly for a time range criterion, the corresponding index can have references to items having a field that complies with the time range.

Additional indexes can be related to access or authorization privileges. If a user has limited access to the database, then, when the query is received from the user, the access privileges of the user can be analyzed and, if the user has restricted access, then a corresponding index can be used. Such an index has references or identifiers to items or records with a common access level. This approach can be applied to other characteristics of the user as well. The query host, in determining whether the query complies with one of the pre-defined search criteria, can compare characteristics of the user to characteristics for the predefined indexes. These characteristics might include the user's organization, tenant identifier, subscription rights, registered applications, or other criteria including authorization.

At 330, an index is selected for the query. The index can be any of the types mentioned above or others. For speed, the index will be a predefined index that has entries that comply with the corresponding search criterion. However, for later searches, or even a new query, a new index can be built before the search is executed.

At 340, the query is applied to the selected index. The application to the index can come before any post-filtering of the results against the database. In this way, the index reduces the number of possible hits before any post-filtering is applied. The index can also be used for pre-filtering before the query is applied to other search indexes. In other words, the results are filtered before the search is performed. The search can then focus on the results from the first index and avoid wasting time or computational resources on results that will not be provided to the user in the end. When the index corresponds to an aspect of the query, the index can be used to reduce the results to only those that comply with the most essential criteria. This also saves time in the subsequent search process.

The listed items within the index can also be ordered so that the query is applied to the index items in a particular order. This can be used to quickly find, for example, the 200 most recently modified listings, or the 200 most recent messages, or the 200 most recent or largest payments. The ordering within the index can be based on any useful criterion such as size price, time date, popularity, etc. This ordering can be used to find results very quickly by applying the query to indexed items based on the ordering of the index. The index results can then be referenced to the database using identifiers within the index.

At 350, items are selected based on applying the query to the selected index. The selection relies on the way that the query is applied. Typically, matching is used, but ranging and other techniques can be applied. In one example tools within Lucene are applied to make these selections.

At 360, the query is applied to further indexes. This is done after applying the query to the first selected index. The next index may be a selected second predefined index of the database that corresponds to a second one of the search criteria in the query. In one example, the additional indexes are to satisfy the remaining criteria of the query. In another example, additional indexes may be selected based on the characteristics of the user that submitted the query. In any event, to benefit from the first index, the query is applied to the next index after the first index and the application to the second index is limited to items that already have been determined to satisfy the first search criterion. In other words, the query is applied to the second selected index after it is applied to the first selected index.

For a sequence of indexes, the application to the indexes can be staged or sequenced in different ways. The number of items in each index can be used so that the query is applied to an index with fewer items before an index with more items. The ordering can also be based on the size of each index. In this way, shorter indexes or indexes with shorter pointers that can be processed more quickly are applied first to reduce the number of results, then longer slower pointers or shorter indexes are applied next with the already restricted result set.

In another embodiment, the query is applied to all indexes simultaneously. The results from each index are matched using a sequence that is selected to provide the most relevant results. In such a case, the search indexes are ordered based on the contents of the query in the manner described above. The query is applied to each index at about the same time, depending upon resource allocation for the search system. The result set from each query is then combined to generate the result set that is returned to the user as the response to the query. The result set from each index is combined with the result set from each other query based on the ordering. In this way, the results are first limited by the first ordered criterion, etc. The final result set may then contain results that are more relevant by selecting which index to use first.

At 370, a final result set for the query is built by the query host for delivery to the user. The result set will include only items that are in the first selected index. As mentioned above, typically the index will only have references to items in the multi-tenant database. To build a reported result set, the query host first accesses the selected items in the results list from the multi-tenant database using the identifiers, references, or pointers retrieved from the index. Using a list of pointers or indexes that point to data in the multi-tenant database, rather than a list of the actual data, allows the index to be searched more quickly. It also reduces the amount of memory required to store each index. After the items are identified through the index, the pointers can then be used to retrieve the actual items. These are compiled into an appropriate format and sent to the user. In one embodiment, as items are retrieved from the index using the pointers, the results are post-filtered to remove certain results from the report.

Figure 4:
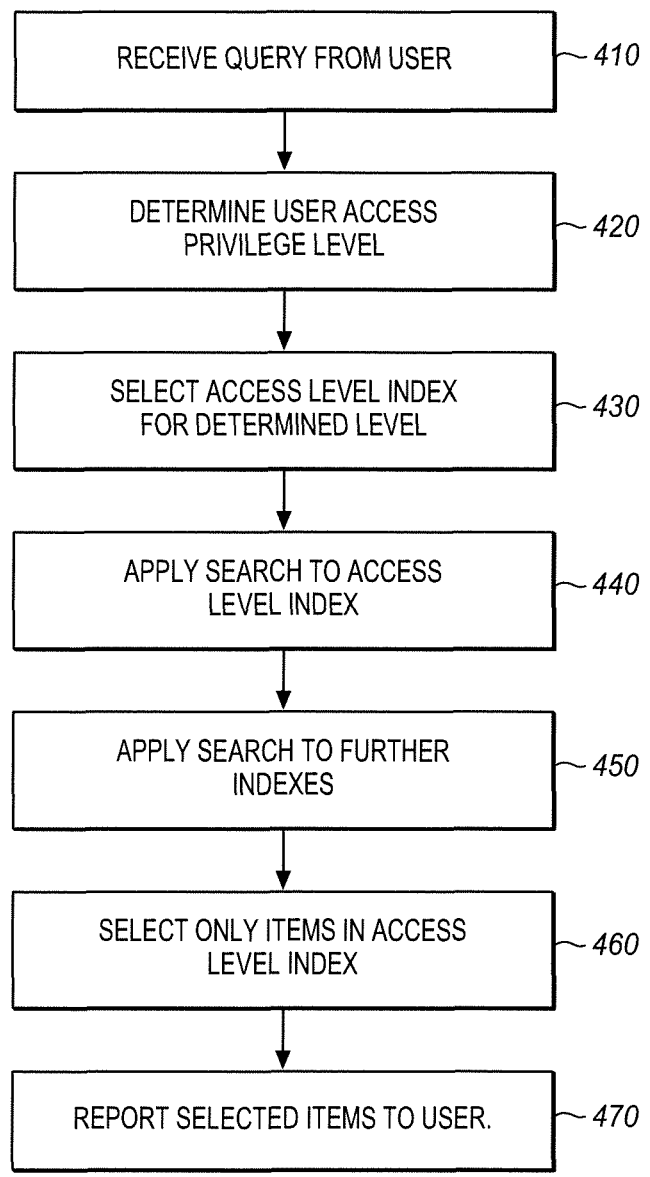
FIG. 4 is an operational flow diagram illustrating a high level overview of a technique for querying a multi-tenant database in an embodiment using an access level index in an embodiment.

FIG. 4 is a simplified flowchart of an example of using an index to improve searching with a user that has limited authorization rights. In this example, a user belongs to an organization that has established different levels of access to a common set of information in the multi-tenant database. A high level manager might have access to all of the data, while a divisional accountant might have access only to financial data for a single division. A sales associate might have access only to that associate's accounts, etc. Such a set of authorization levels can be established by the organization or by an administrator of the account. As mentioned above, for the high level manager, there may not be a benefit to filtering data because all of the data is available. However, for the sales associate, most of the data will not be visible. By limiting searches to only the available data, queries can be processed more quickly and higher quality results will be obtained.

At 410 in FIG. 4, a query is received from the user. The query can come from the client device 204 and be supplied to the application server 206. Upon determining that the incoming request is a query, the query can be passed to the query host 210. The application server may perform some processing of the query first or may simply pass the query on.

At 420, the user's access privilege level is determined. This may be done by the application server or the query host or by some other equipment. Typically, the user will have logged in using a user identification through a specialized application or an internet browser window. The user identification can be linked to a set of rights and characteristics of the user. This information can include an organization identifier, subscription status, activity status, user preferences for the application or browser and the access privileges or authorization rights to data in the multi-tenant database. Alternatively, the access privileges can be obtained from a user identifier, a MAC (Media Access Control) address, or in any other way.

At 430, the access level, or access privileges level, or authorization level is identified and then used to select an index to which the query will be applied. The indexes can be predefined and in the case of unlimited access, the process may stop and the query simply handled conventionally. For restricted access, a predefined index corresponding to that level of access is selected. The selected index will contain only those items that correspond to the determined user access privilege level. In other words, only items that the user can see will be included in the index.

In a search index store 212, there may be many different indexes, corresponding to different user access privilege levels of the database. Having identified a privilege level for the user one of the privilege level search indexes can be selected for the query. The selected privilege level search index contains identifiers or pointers only to database items corresponding to the determined user access privilege level. For a more complex access privileges system, there may be multiple indexes used to correspond to a particular users access privileges level.

At 440, the query is applied to the index. This will result in a list of results or hits. The list of results can be further narrowed at 450 by then applying the search to more indexes of the database. These additional indexes can be based on other criteria in the query or additional characteristics of the user. After these indexes, the query is fully processed to develop the final result list.

At 460 a list of results are compiled. These results will include only items that are represented in the selected user access privilege level index or indexes. The indicated results are retrieved from the database for a result set based on the query. These results may be post-filtered against the database, in some embodiments. At 470, this result set of the selected items is presented to the user. The user can then present further queries, retrieve additional data for each result, edit or modify data, etc.

System Overview

Figure 5:
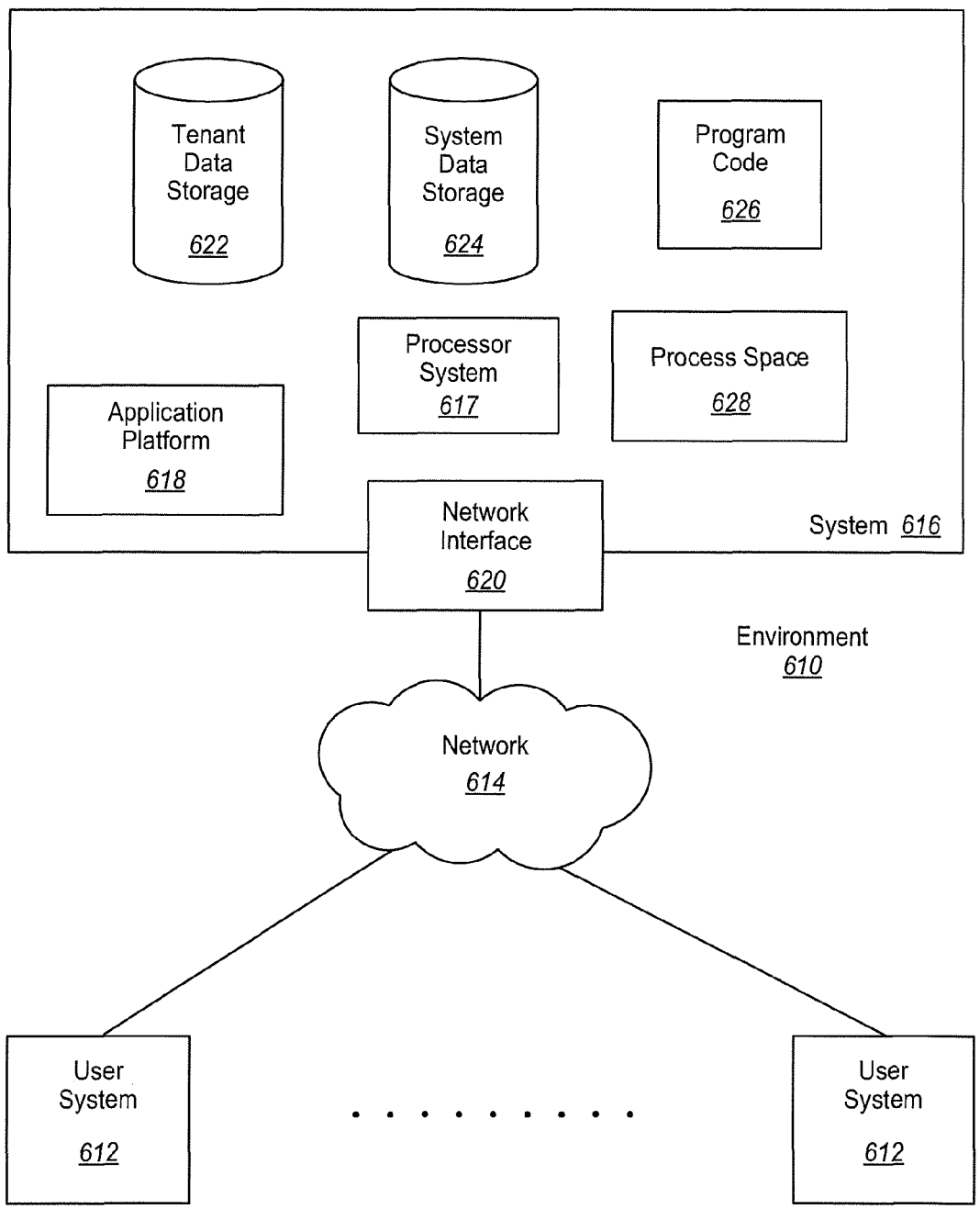
FIG. 5 illustrates a block diagram of an example of an environment wherein an on-demand database service might be used.

FIG. 5 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 5 (and in more detail in FIG. 6) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 5, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 5, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 5 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
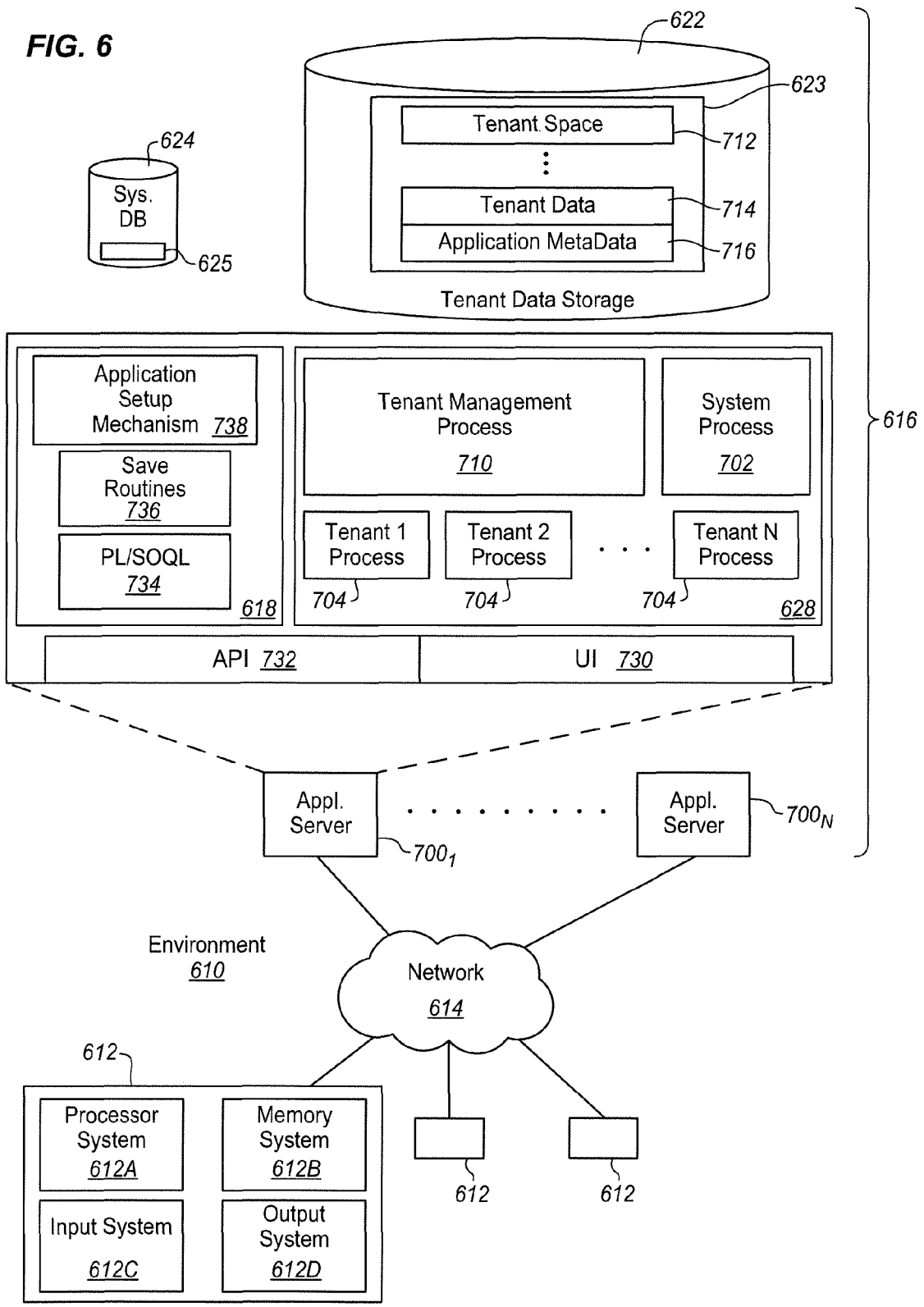
FIG. 6 illustrates a block diagram of an embodiment of elements of FIG. 6 and various possible interconnections between these elements.

FIG. 6 also illustrates environment 610. However, in FIG. 6 elements of system 616 and various interconnections in an embodiment are further illustrated. FIG. 6 shows that user system 612 may include processor system 612A, memory system 612B, input system 612C, and output system 612D. FIG. 6 shows network 614 and system 616. FIG. 6 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700₁-700ₙ, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 5. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 6, system 616 may include a network interface 620 (of FIG. 5) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700₁ might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 6 is a description of a database architecture and how applications may be configured to use the database. The search systems of FIG. 2 are not explicitly shown in FIG. 6, but form part of the system 616. The search index store and search indexes may be a part of the system database 624 or may provided by other databases or servers (not shown). The applications servers 700, API 732 and processes, may also include the application server 206, query host 210, and indexer of FIG. 2.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   receiving a query directed to a search;
   analyzing the query to select a characteristic of the query that limits the number of records that the query can retrieve from a database;
   determining whether the selected query characteristic complies with a search criterion of a plurality of search criteria, each of the plurality of search criteria corresponding to a predefined search index, each predefined search index being drawn from a database and containing identifiers for records of items in the database;
   selecting a predefined search index corresponding to the selected query characteristic;
   applying the search criterion for the selected query characteristic to the selected predefined search index;
   selecting items subject to a collection limit based on applying the search criterion to the selected predefined search index, the collection limit limiting the total number of items that are selected;
   post-filtering the selected items against the database using search criteria of the received query other than the search criterion of the selected query characteristic; and
   returning a result set for the query, the result set including only items returned from the post-filtering.

2. The method of claim 1, wherein one of the plurality of search criteria is time, wherein the selected predefined search index is ordered based on a time sequence from most recent to least recent and wherein the query is applied to most recent items of the selected predefined search index first based on the ordering of the selected predefined search index.

3. The method of claim 1, wherein one of the plurality of criteria comprises a time range and wherein the selected predefined search index comprises references to items having a field that complies with the time range.

4. The method of claim 1, wherein one of the plurality of criteria comprises access privileges and wherein the selected predefined search index comprises references to items with a common access privileges.

5. The method of claim 1, wherein the query is received from a user, the method further comprising determining characteristics of the user and wherein determining whether the query complies with one of a plurality of search criteria comprises comparing characteristics of the user to characteristics of the search criteria.

6. The method of claim 1, wherein the search criteria are ordered so that a query is applied to each complying predefined search index in a specific order, a complying predefined search index being a predefined search index corresponding to one of the plurality of search criteria with which the query complies.

7. The method of claim 6, wherein the ordering is based on a number of items in each index, wherein a query is applied to an index with fewer items before an index with more items.

8. The method of claim 6, wherein the ordering is based on the size of each index, wherein a query is applied to a shorter index before being applied to a longer index.

9. The method of claim 6, wherein each complying predefined search index is ordered based on a determined value and wherein applying the query further comprises applying the query to find database items based on the ordering of the index.

10. The method of claim 1, further comprising applying the query to further indexes after applying the query to the selected predefined search index.

11. The method of claim 1, further comprising selecting a second predefined search index of the database corresponding to a second one of the plurality of search criteria and applying the query to the second selected predefined search index after applying the query to a first selected predefined search index.

12. The method of claim 1, wherein the selected predefined search index comprises references to items in the database and wherein building a report comprises accessing selected items from the database using the references of the selected predefined search index.

13. The method of claim 1, further comprising post-filtering the selected items against the database based on the query.

14. A machine-readable medium carrying one or more sequences of instructions, which instructions, when executed by one or more processors, cause the one or more processors to carry out the steps of:

receiving a query directed to a search;

analyzing the query to select a characteristic of the query that limits the number of records that the query can retrieve from a database;

determining whether the selected query characteristic complies with a search criterion of a plurality of search criteria, each of the plurality of search criteria corresponding to a predefined search index, each predefined search index being drawn from a database and containing identifiers for records of items in the database;

selecting a predefined search index corresponding to the selected query characteristic;

applying the search criterion for the selected query characteristic to the selected predefined search index;

selecting items subject to a collection limit based on applying the search criterion to the selected predefined search index, the collection limit limiting the total number of items that are selected;

post-filtering the selected items against the database using search criteria of the received query other than the search criterion of the selected query characteristic; and returning a result set for the query, the result set including only items returned from the post-filtering.

15. The machine-readable medium as recited in claim 14, wherein the search criteria are ordered so that a query is applied to each complying predefined search index in a specific order, a complying predefined search index being a predefined search index corresponding to one of the plurality of search criteria with which the query complies.

16. The machine-readable medium as recited in claim 14, wherein the predefined search indexes are ordered and wherein the result set from each query is combined with the result set from each other query based on the ordering.

17. An apparatus comprising:

a processor; and one or more stored sequences of instructions which, when executed by the processor, cause the processor to carry out the steps of receiving a query directed to a search;

analyzing the query to select a characteristic of the query that limits the number of records that the query can retrieve from a database;

determining whether the selected query characteristic complies with a search criterion of a plurality of search criteria, each of the plurality of search criteria corresponding to a predefined search index, each predefined search index being drawn from a database and containing identifiers for records of items in the database;

selecting a predefined search index corresponding to the selected query characteristic;

applying the search criterion for the selected query characteristic to the selected predefined search index;

selecting items subject to a collection limit based on applying the search criterion to the selected predefined search index, the collection limit limiting the total number of items that are selected;

post-filtering the selected items against the database using search criteria of the received query other than the search criterion of the selected query characteristic; and returning a result set for the query, the result set including only items returned from the post-filtering.

18. The method of claim 1, wherein the received query is received from a user, the method further comprising:

determining a user access privilege level for the query, each user access privilege level allowing access to different sets of items of the database;

selecting one of a plurality of privilege level search indexes, each privilege level search index corresponding to a user access privilege level of the database, the selected privilege level search index containing only items corresponding to the determined user access privilege level; and applying the search to the selected privilege level search index, wherein returning a result set for the query comprises returning a result set including only items of the selected privilege level search index.

19. The method of claim 18, further comprising determining whether the query complies with one of a plurality of additional search criteria, each of the plurality of additional search criteria corresponding to a predefined search index, and selecting additional predefined search indexes to which the query is applied.

20. The method of claims 19, wherein the search criteria are ordered so that the results from each selected predefined search index are in a specific order.

* * * * *